United States Patent
Zhao et al.

(10) Patent No.: US 12,471,199 B2
(45) Date of Patent: Nov. 11, 2025

(54) DIMMER-TYPE DIMMING POWER SUPPLY (71) Applicant: Zhuhai Shengchang Electronics Co., Ltd., Guangdong (CN)

(72) Inventors: Xianyun Zhao, Chongqing (CN); Dehua Zheng, Zhuhai (CN)

(73) Assignee: Zhuhai Shengchang Electronics Co., Ltd., Zhuhai (CN)

( * ) Notice: Subject to any disclaimer, the term of this patent is extended or adjusted under 35 U.S.C. 154(b) by 94 days.

(21) Appl. No.: 18/595,937

(22) Filed: Mar. 5, 2024

(65) Prior Publication Data

US 2025/0254779 A1 Aug. 7, 2025

(30) Foreign Application Priority Data

Feb. 3, 2024 (CN) .......................... 202410152293.9

(51) Int. Cl.
*H05B 47/17* (2020.01)
*H05B 47/14* (2020.01)

(52) U.S. Cl.
CPC ............. *H05B 47/17* (2020.01); *H05B 47/14* (2020.01)

(58) Field of Classification Search
CPC ................................ H05B 47/17; H05B 47/14
See application file for complete search history.

(56) References Cited

U.S. PATENT DOCUMENTS

| | | | | | |
|---|---|---|---|---|---|
| 5,196,782 | A | * | 3/1993 | D'Aleo | H05B 47/10 323/299 |
| 6,577,512 | B2 | * | 6/2003 | Tripathi | H05B 45/10 363/21.17 |
| 2010/0013649 | A1 | * | 1/2010 | Spira | H05B 47/17 315/291 |
| 2013/0134875 | A1 | * | 5/2013 | Qin | H05B 45/50 315/85 |
| 2015/0334800 | A1 | * | 11/2015 | Fawaz | H05B 45/60 315/294 |
| 2018/0139811 | A1 | * | 5/2018 | Ekbote | H05B 45/3725 |

* cited by examiner

Primary Examiner — Daniel D Chang
(74) Attorney, Agent, or Firm — Wang Law Firm, Inc.

(57) ABSTRACT

The present invention discloses a dimmer-style dimming power supply, comprising a housing, a control board disposed within the housing, and multiple operation terminals disposed on the housing. The control board is equipped with an electromagnetic compatibility module, a switching supply power module, a main control module, an output adjustment module, and a dimming control module. By integrating the dimmer with the dimming power supply, the present invention not only reduces wiring, but also features convenient installation, compact structure, and small size, which can greatly reduce costs, with the functions of dimming and color adjustment. In addition, the present invention can also be configured to meet the requirements of the U.S. CLASS2 standard.

13 Claims, 8 Drawing Sheets

DIMMER-TYPE DIMMING POWER SUPPLY

FIELD OF INVENTION

The present invention relates to the field of LED power supplies, in particular to a dimmer-type dimming power supply.

BACKGROUND OF THE INVENTION

As the standard of living increases, so does the demand for lighting. In various living scenarios, lighting adjustment becomes essential. In current technology, the typical approach to lighting adjustment is to send dimming instructions to dimming power supplies via dimmers or dimming systems. Upon receiving these signals, the dimming power supply adjusts its output to change the brightness, color temperature, or color of the lighting. However, this method not only involves complex wiring, but also requires compatibility between the dimmer/dimming system and the dimming power supply. For example, if a dimmer operates on a 0-10V system, it requires a compatible 0-10V dimming power supply. Similarly, if a phase-cut dimming system is used, a corresponding phase-cut dimming power supply is required. Moreover, the dimmers and dimming power supplies are relatively costly and their control mechanisms are complex. Hence, there is an immediate need for a dimmer-style dimming power supply to address these issues.

SUMMARY OF THE INVENTION

The present invention aims to solve at least one of the technical problems existing in the prior art. To this end, the present invention proposes a dimmer-type dimming power supply.

An embodiment of the present invention adopts the following technical solution to solve the technical problems: a dimmer-type dimming power supply, comprising a housing, a control board disposed within the housing, and multiple operation terminals disposed on the housing. The control board is equipped with an electromagnetic compatibility module, a switching supply power module, a main control module, an output adjustment module, and a dimming control module.

The input of the electromagnetic compatibility module is connected to an alternating current power source.

The switching supply power module is connected to the electromagnetic compatibility module.

The output adjustment module is connected to the switching supply power module and connected to the luminaire.

The main control module is respectively connected to the switching supply power module and the output adjustment module.

The dimming control module is respectively connected to the main control module and the multiple operation terminals for generating dimming instruction signals.

The main control module outputs PWM control signals to the output adjustment module according to the dimming instruction signals generated by the dimming control module to control the brightness, color temperature, and/or color of the luminaire.

As one of the preferred embodiments of the present invention, the switching supply power module includes a power factor correction module and a power conversion module.

The input of the power factor correction module is connected to the electromagnetic compatibility module for improving the power factor and reducing current harmonics.

The input of the power conversion module is connected to the output of the power factor correction module, and the output is respectively connected to the main control module and the output adjustment module for converting power and supplying power to the main control module, output adjustment module, and luminaire.

As one of the preferred embodiments of the present invention, the output adjustment module includes a MOSFET and a drive module, a source of the MOSFET is connected to the switching supply power module, and a drain of the MOSFET is connected to an output terminal. The drive module is respectively connected to the main control module and a gate of the MOSFET, and the luminaire is connected to the output terminal to adjust the brightness of the luminaire.

As one of the preferred embodiments of the present invention, the dimmer-type dimming power supply further comprises a detection module and an overcurrent protection module, wherein one end of the detection module is connected to the switching supply power module, the other end of the detection module is respectively connected to the input of the overcurrent protection module and the source of the MOSFET, and the output of the overcurrent protection module is connected to the drive module.

As one of the preferred embodiments of the present invention, the dimmer-type dimming power supply further comprises the detection module, wherein one end of the detection module is connected to the switching supply power module, and the drive module is respectively connected to the main control module and the other end of the detection module. The main control module can control the on-off of the MOSFET through the drive module according to the feedback signal from the detection module.

As one of the preferred embodiments of the present invention, the output adjustment module includes at least two MOSFETs and at least two drive modules.

The source of the MOSFET is connected to the switching supply power module, the drain of the MOSFET is connected to the output terminal, and the drive module is respectively connected to the main control module and the gate of the MOSFET to form at least two output adjustment circuits.

The luminaire is connected to the output terminal to adjust the brightness, color temperature, and/or color of the luminaire.

As one of the preferred embodiments of the present invention, the dimmer-type dimming power supply further comprises at least two detection modules and at least two overcurrent protection modules, wherein one end of the detection module is connected to the switching supply power module, the other end of the detection module is respectively connected to the input of the overcurrent protection module and the source of the MOSFET, and the output of the overcurrent protection module is connected to the drive module to limit the output power and the output current of each output adjustment circuit.

As one of the preferred embodiments of the present invention, the dimming control module includes a potentiometer dimming circuit or an encoder dimming circuit for adjusting the brightness of the luminaire.

As one of the preferred embodiments of the present invention, the dimming control module includes at least two potentiometer dimming circuits or at least two encoder dimming circuits for adjusting the brightness, color temperature, and/or color of the luminaire.

As one of the preferred embodiments of the present invention, the dimming control module is configured as a touch dimming circuit or a wireless signal dimming circuit for adjusting the brightness, color temperature, and/or color of the luminaire.

Advantages of the present invention: The dimmer-type dimming power supply comprising the housing, the control board disposed within the housing, and the multiple operation terminals disposed on the housing. The control board is equipped with the electromagnetic compatibility module, the switching supply power module, the main control module, the output adjustment module, and the dimming control module. Wherein the input of the electromagnetic compatibility module is connected to the alternating current power source; the switching supply power module is connected to the electromagnetic compatibility module; the output adjustment module is connected to the switching supply power module and connected to the luminaire; the main control module is respectively connected to the switching supply power module and the output adjustment module; and the dimming control module is respectively connected to the main control module and the multiple operation terminals for generating the dimming instruction signals. The main control module outputs the PWM control signals to the output adjustment module according to the dimming instruction signals generated by the dimming control module to control the brightness, color temperature, and/or color of the luminaire. By integrating the dimmer with the dimming power supply, the present invention not only reduces wiring, but also the present invention features convenient installation, compact structure, and small size, which can greatly reduce costs, with the functions of dimming and color adjustment. In addition, the present invention can also be configured to meet the requirements of the U.S. CLASS2 standard for power supply under high power and high current conditions.

BRIEF DESCRIPTION OF THE DRAWINGS

The above and/or additional aspects and advantages of the present invention will become apparent and readily appreciated from the description of the embodiments in conjunction with the accompanying drawings, in which.

DETAILED DESCRIPTION OF THE PREFERRED EMBODIMENTS

This section will describe in detail specific embodiments of the present invention. The preferred embodiments of the present invention are illustrated in the accompanying drawings, which supplement the description in the text portion of the specification and enable one to intuitively and clearly understand each technical feature and the overall technical solution of the present invention. However, these drawings should not be construed as limiting the scope of the present invention.

In the description of the present invention, "multiple" means two or more, and terms such as "greater than," "less than," "exceeding," etc., are understood not to include the number itself. Terms such as "above," "below," "within" are understood to include the number. When used in the specification, the terms "first," "second," etc. are used for the purpose of distinguishing technical features and should not be construed as indicating or implying the relative importance or quantity or sequential relationship of the technical features specified.

In the description of the present invention, when it comes to positional descriptions such as "top," "bottom," "front," "back," "left," "right," etc., these indicate positions based on the orientation shown in the drawings solely for the purpose of facilitating the description of the invention and simplifying the description, and should not be construed as limiting the invention.

In the present invention, unless otherwise specified, words such as "setting," "installation," "connection," etc., should be construed broadly. For example, a connection may be made directly or indirectly through an intermediary; it may be fixed or detachable; it may be mechanically connected; it may be an internal connection of two components or the interaction relationship between two components. Those skilled in the art can reasonably determine the specific meanings of the above words in the present invention based on the specific content of the technical solution.

Referring to FIGS. 1 to 8, a dimmer-type dimming power supply comprising: a housing 90, a control board disposed within the housing 90, and multiple operating terminals 91 disposed on the housing 90. The control board is equipped with an electromagnetic compatibility module 10, a switching supply power module 20, a main control module 30, an output adjustment module 40, and a dimming control module 50.

The input of the electromagnetic compatibility module 10 is connected to an alternating current power supply;

The switching supply power module 20 is connected to the electromagnetic compatibility module 10.

The output adjustment module 40 is connected to the switching supply power module 20 and connected to the luminaire.

The main control module 30 is respectively connected to the switching supply power module 20 and the output adjustment module 40.

The dimming control module 50 is respectively connected to the main control module 30 and the multiple operating terminals 91 for generating dimming instruction signals.

The main control module 30 outputs PWM control signals to the output adjustment module 40 according to the dimming instruction signals generated by the dimming control module 50 to control the brightness, color temperature, and/or color of the luminaire.

Figure 1:
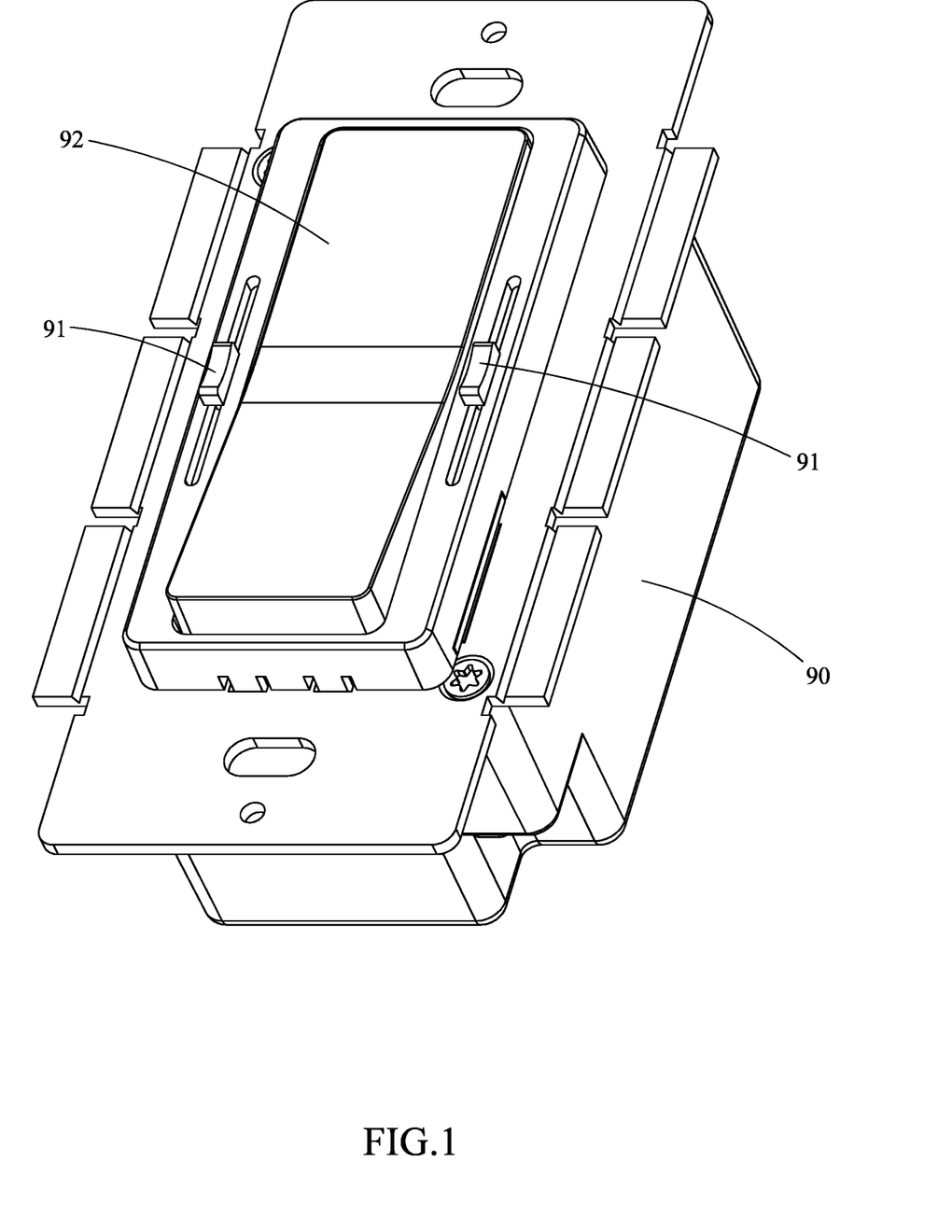
FIG. 1 is a schematic diagram of the structure of the dimmer-type dimming power supply.
Figure 2:
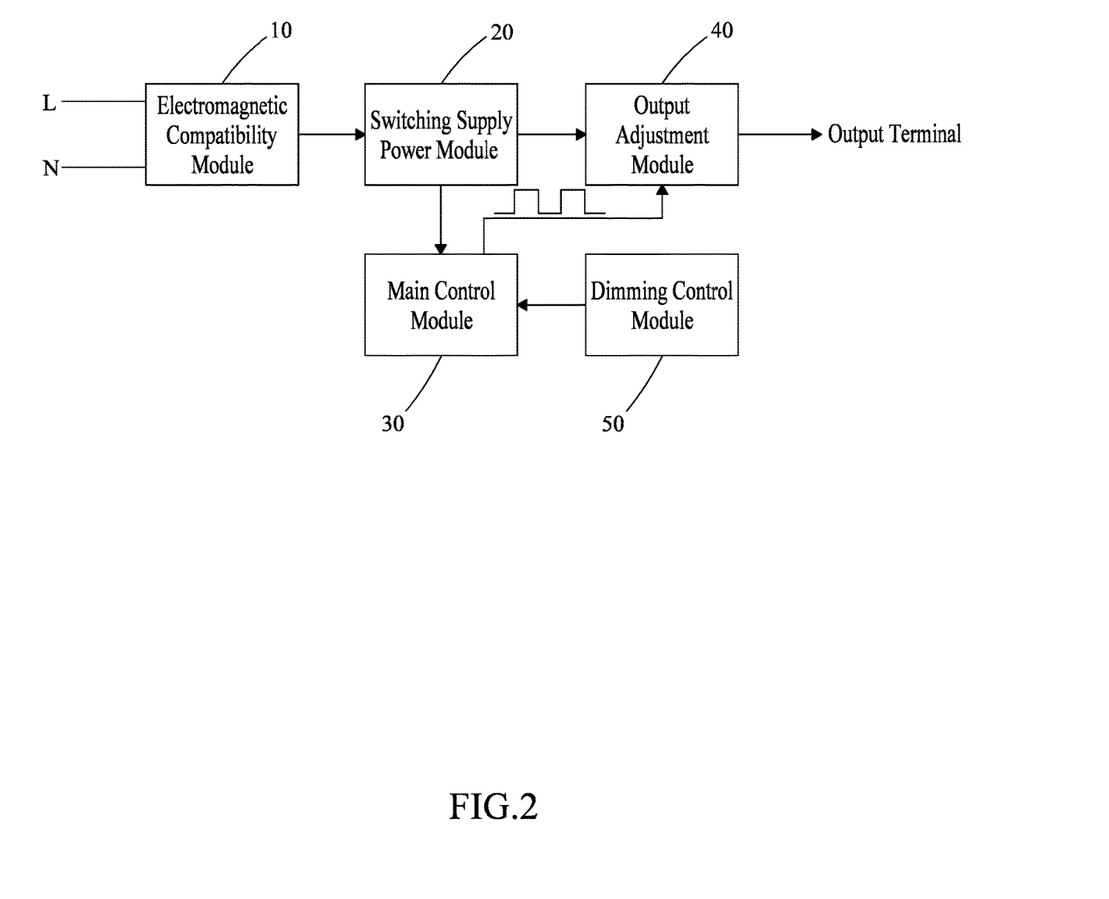
FIG. 2 is a block diagram of the principle of a first embodiment of the dimmer-type dimming power supply.

Referring to FIGS. 1-2, in the present invention, the shape of the dimmer-type dimming power supply is dimmer-like, with a dimming control panel at the top. In some typical embodiments, a switch 92 is also provided to control the input of the dimmer-type dimming power supply and the on-off of the AC power supply. Internally, the dimmer-type dimming power supply includes the electromagnetic compatibility module 10, the switching supply power module 20, the main control module 30, the output adjustment module 40, and the dimming control module 50. Among them, the switching supply power module 20 is used for power conversion, and the dimming control module 50 can generate dimming instruction signals when the operating terminals 91 are operated. The main control module 30 can output PWM control signals to the output adjustment module 40 according to the dimming instruction signals generated by the dimming control module 50 to control the brightness, color temperature, and/or color of the luminaire. Because the internal space of the dimmer-type dimming power supply is compact, multiple circuit boards can be spliced together to maximize space utilization, which can increase the power density while reducing the volume. The advantage of the present invention is that: By integrating the dimmer with the dimming power supply, the present invention not only reduces wiring but also features convenient installation, compact structure and small size, which can greatly reduce costs, with the functions of dimming and color adjustment. In addition, the present invention can also be configured to meet the requirements of the U.S. CLASS2 standard for power supply under high power and high current conditions.

Figure 3:
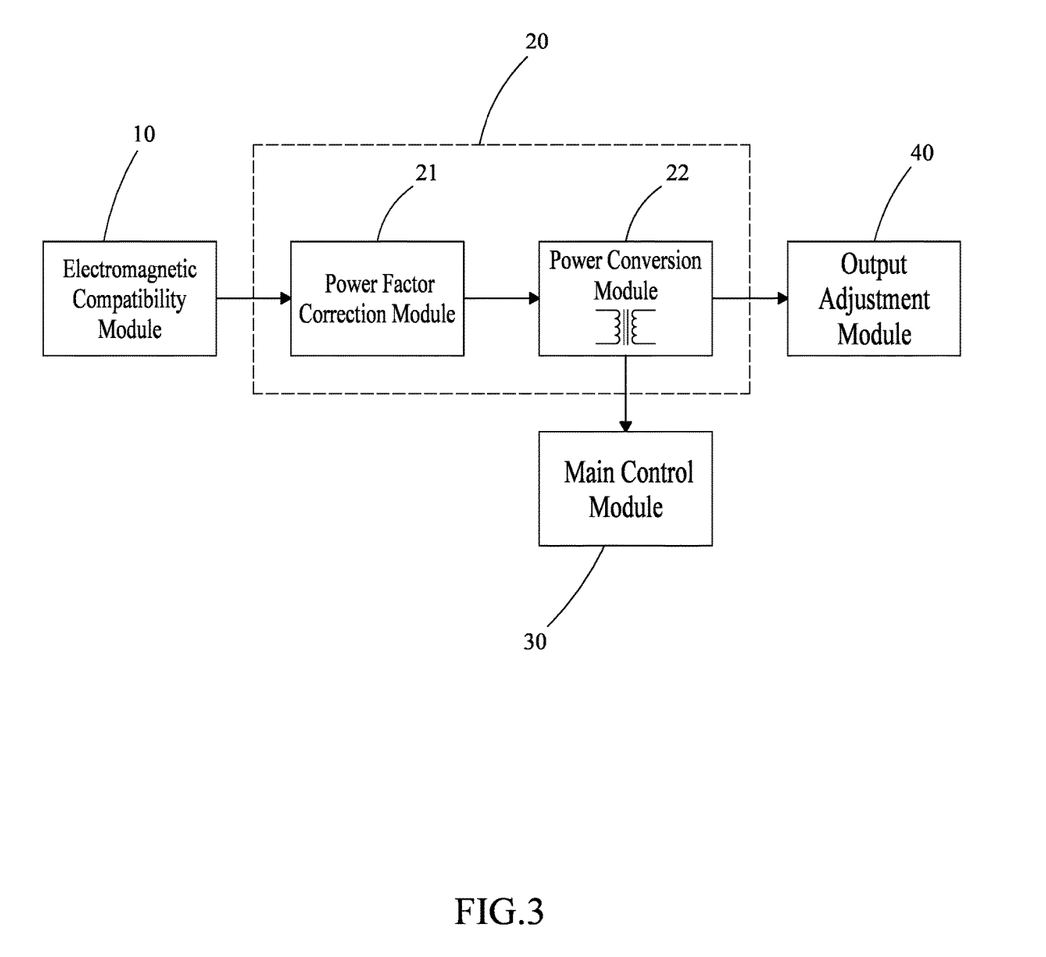
FIG. 3 is a block diagram of the principle of a second embodiment of the dimmer-type dimming power supply.

Referring to FIG. 3, as a preferred embodiment of the switching supply power module 20, the switching supply power module 20 includes a power factor correction module 21 and a power conversion module 22.

The input of the power factor correction module 21 is connected to the electromagnetic compatibility module 10 for improving the power factor and reducing current harmonics.

The input of the power conversion module 22 is connected to the output of the power factor correction module 22, and the output is respectively connected to the main control module 30 and the output adjustment module 40 for converting power and supplying power to the main control module 30, the output adjustment module 40, and the luminaire.

Figure 4:
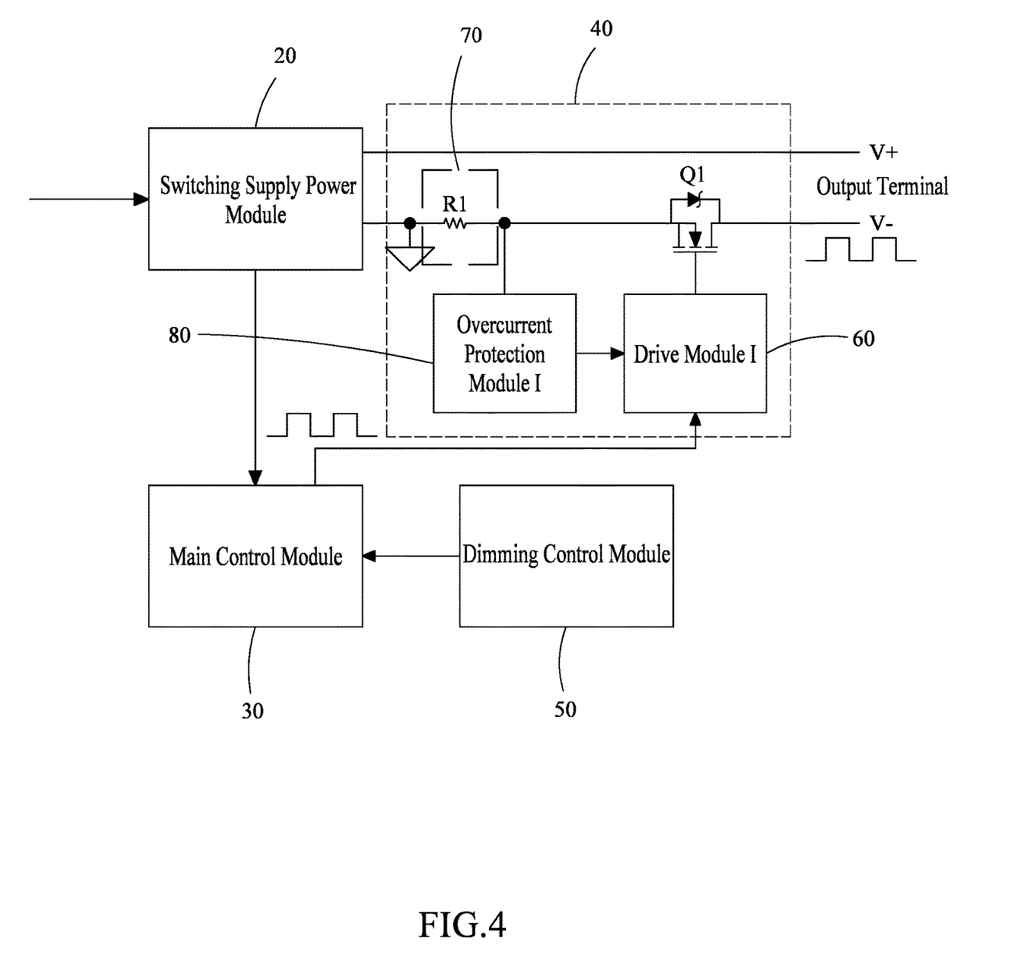
FIG. 4 is a block diagram of the principle of a third embodiment of the dimmer-type dimming power supply.

Referring to FIG. 4, as a first embodiment of the output adjustment module 40, the output adjustment module 40 includes a MOSFET and a drive module 60; wherein a source of the MOSFET is connected to the switching supply power module 20, and a drain is connected to an output terminal. The drive module 60 is respectively connected to the main control module 30 and a gate of the MOSFET, and the luminaire is connected to the output terminal to adjust the brightness of the luminaire. The output mode of the main control module 30 is a PWM mode, the PWM control signal output by the main control module 30 is amplified by the drive module 60 to drive the MOSFET Q1, and the duty cycle of the PWM control signal determines the duty cycle of the PWM output by the output adjustment module 40, which directly affects the brightness of the luminaire. Certainly, in some applications, the brightness of the luminaire can also be changed by adjusting the voltage or current.

Referring to FIG. 4, as a first embodiment of overcurrent and short-circuit protection, the dimmer-type dimming power supply further comprises a detection module 70 and an overcurrent protection module 80; wherein one end of the detection module 70 is connected to the switching supply power module 20, the other end of the detection module 70 is respectively connected to the input of the overcurrent protection module 80 and the source of the MOSFET, and the output of the overcurrent protection module 80 is connected to the drive module 60. Wherein the detection module 70 includes a resistor R1, and the implementation of the overcurrent and short-circuit protection depends on a separate overcurrent protection module 80. Specifically, the overcurrent protection module 80 detects the voltage drop generated by the current flowing through the resistor R1 to determine whether the overcurrent or the short-circuit has occurred. When the voltage drop across the resistor R1 reaches the overcurrent protection trigger voltage threshold, the overcurrent protection module 80 will send a signal to the drive module 60 to turn off the output, which causes the MOSFET Q1 to turn off, thereby achieving the overcurrent and short-circuit protection function.

Figure 6:
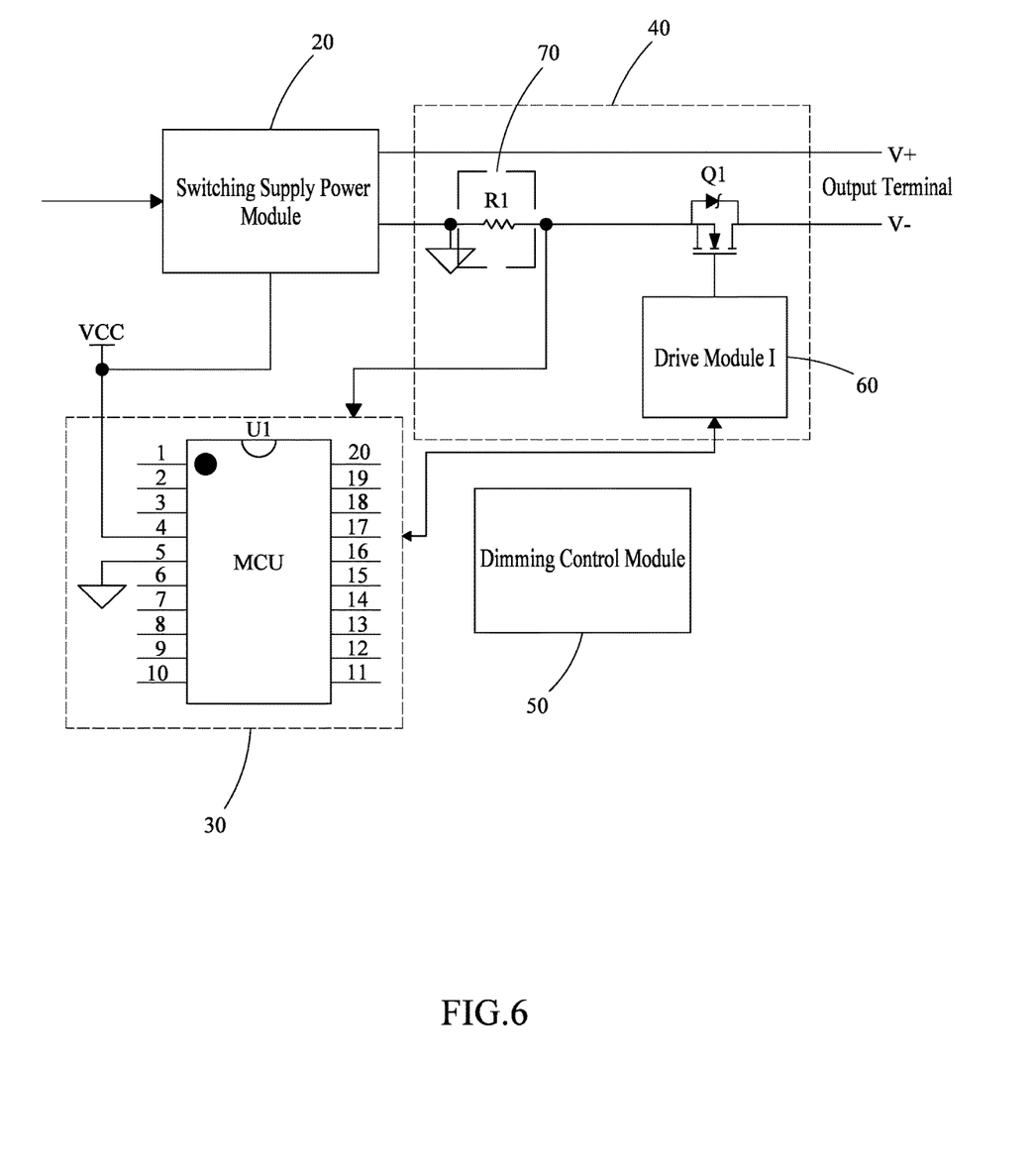
FIG. 6 is a block diagram of the principle of a fifth embodiment of the dimmer-type dimming power supply.

Referring to FIG. 6, as a second embodiment of the overcurrent and short-circuit protection, the dimmer-type dimming power supply further comprises the detection module 70; one end of the detection module 70 is connected to the switching supply power module 20, and the drive module 60 is respectively connected to the main control module 30 and the other end of the detection module 70. The main control module 30 can control the on-off of the MOSFET through the drive module 60 according to the signal feedback from the detection module 70. Wherein the detection module 70 includes the resistor R1, and the implementation of the overcurrent and short-circuit protection can be realized by a microcontroller U1 in the main control module 30, which detects the voltage drop generated by the current flowing through the resistor R1 to determine whether the overcurrent or the short-circuit has occurred, so that the overcurrent and short-circuit protection can be achieved by a program control. Specifically, when the microcontroller U1 in the main control module 30 detects that the voltage drop generated by the current across the resistor R1 reaches the overcurrent protection trigger voltage threshold, the main control module 30 will stop outputting signals to the output adjustment module 40, thereby achieving the overcurrent and short-circuit protection function.

Figure 5:
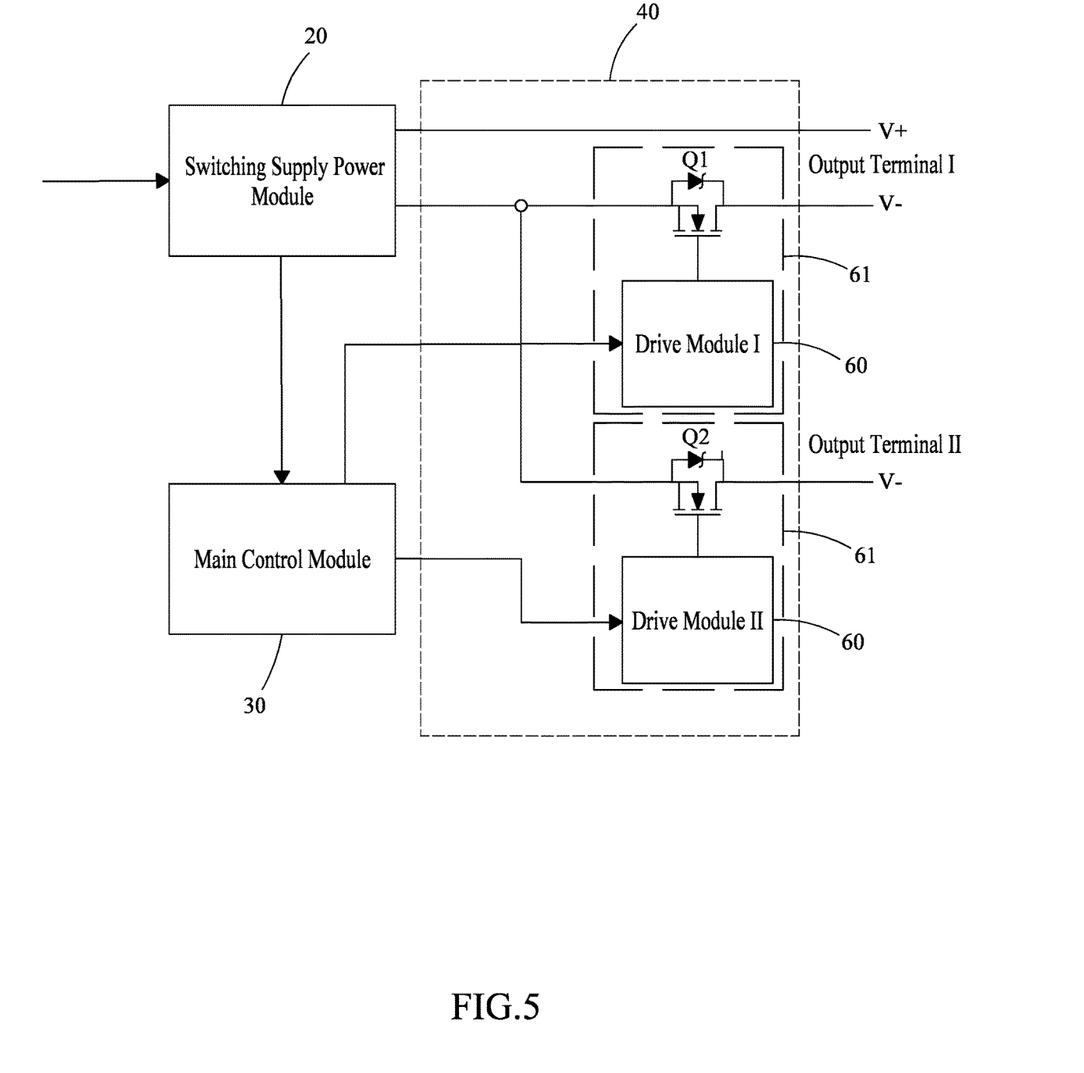
FIG. 5 is a block diagram of the principle of a fourth embodiment of the dimmer-type dimming power supply.

Referring to FIG. 5, as a second embodiment of the output adjustment module 40, the output adjustment module 40 includes at least two MOSFETs and at least two drive modules 60.

The source of the MOSFET is connected to the switching supply power module 20, the drain is connected to the output terminal, and the drive module 60 is respectively connected to the main control module 30 and the gate of the MOSFET to form at least two output adjustment circuits 61.

The luminaire is connected to the output terminal to adjust the brightness, color temperature, and/or color of the luminaire. Specifically, when the dimmer-type dimming power supply is equipped with color temperature and color adjustment functions, the output adjustment module 40 comprises at least two output adjustment circuits 61, i.e., at least two MOSFETs and at least two drive modules 60, which output through output terminals I and II and are connected to the luminaire without using color temperature; by adjusting the dimming control module 50 to send dimming instructions to the main control module 30, and the main control module 30 sends corresponding PWM control signals to the drive modules 60 in each output adjustment circuit 61 of the output adjustment module 40 to control the output PWM duty cycle of each output adjustment circuit 61, thereby adjusting the brightness, color temperature, or color of the luminaire.

Figure 7:
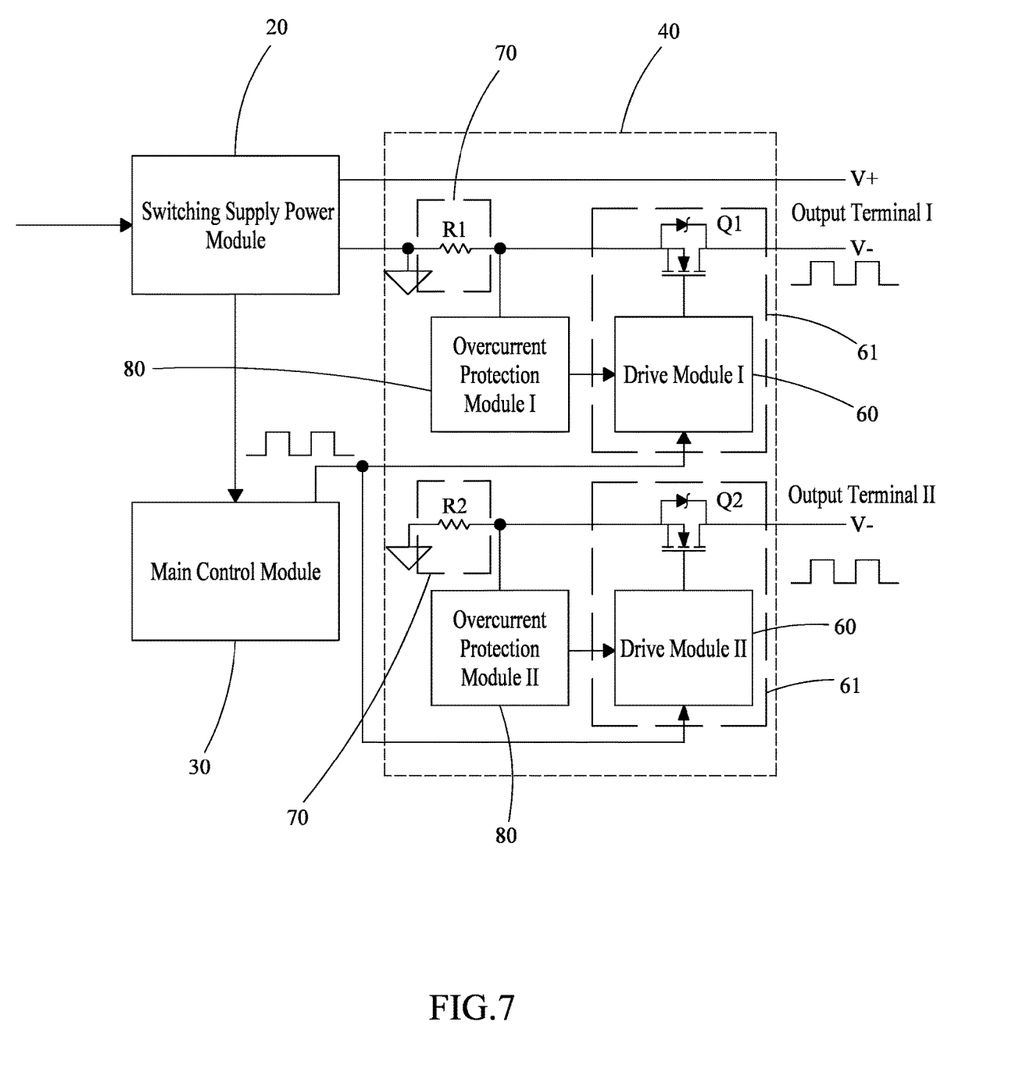
FIG. 7 is a block diagram of the principle of a sixth embodiment of the dimmer-type dimming power supply.

Referring to FIG. 7, as a further embodiment of the present invention, the dimmer-type dimming power supply further comprises at least two detection modules 70 and at least two overcurrent protection modules 80. Wherein, one end of the detection module 70 is connected to the switching supply power module 20, and the other end of the detection module 70 is respectively connected to the input of the overcurrent protection module 80 and the source of the MOSFET. The output of the overcurrent protection module 80 is connected to the drive module 60 to limit the output power and the output current of each output adjustment circuit 61. In some typical embodiments, the output is required to meet the requirements of the U.S. standard CLASS2, i.e., when the total output power is greater than 100 W or the total output current is greater than 5 A, multiple outputs are required, and each output is limited to within 100 W or the current is limited to within 5 A. Therefore, the output adjustment module 40 may include the multiple MOSFETs, the drive modules 60, the overcurrent detection resistors, and the overcurrent protection modules 80 for limiting each power to be not greater than 100 W and each output current to be not greater than 5 A.

Referring to FIG. 1, as a first embodiment of the dimming control module 50, the dimming control module 50 includes a potentiometer dimming circuit 51 or an encoder dimming circuit for adjusting the brightness of the luminaire, wherein the operating terminal 91 is the potentiometer.

Figure 8:
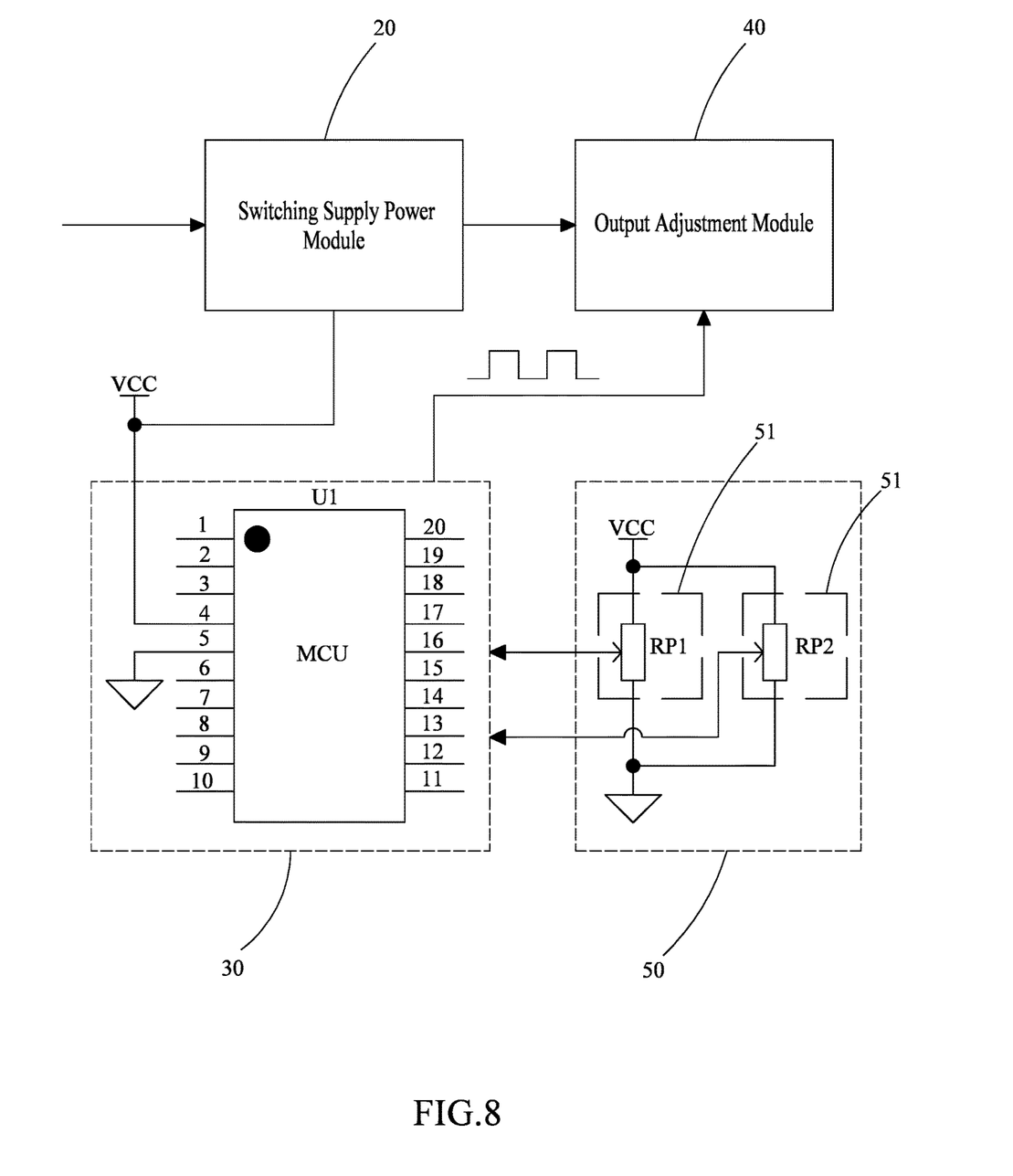
FIG. 8 is a block diagram of the principle of a seventh embodiment of the dimmer-type dimming power supply.

The dimming control module 50 includes at least two potentiometer dimming circuits 51 or at least two encoder dimming circuits for adjusting the brightness, color temperature, and/or color of the luminaire. Referring to FIGS. 1 and 8, as a second embodiment of the dimming control module 50, the dimming control module 50 includes the two potentiometer dimming circuits 51, the operating terminal 91 on the left side of the housing 90 is the potentiometer RP1, and the operating terminal 91 on the right side of the housing 90 is the potentiometer RP2. The inputs of the potentiometers RP1 and RP2 are connected to the VCC terminal, the outputs of the potentiometers RP1 and RP2 are grounded, and the adjustment terminals of the potentiometers RP1 and RP2 are connected to the main control module 30, wherein the potentiometer RP1 is used to adjust the brightness of the luminaire, and the potentiometer RP2 is used to adjust the color temperature or color of the luminaire.

As a third embodiment of the dimming control module 50, the dimming control module 50 is configured as a touch dimming circuit or a wireless signal dimming circuit for adjusting the brightness, color temperature, and/or color of the luminaire.

Of course, the present invention is not limited to the foregoing embodiments. Those skilled in the art may make equivalent modifications or substitutions without departing from the spirit of the present invention. Such equivalent modifications and substitutions are within the scope defined by the claims of the present invention.

What is claimed is:

1. A dimmer-type dimming power supply, comprising a housing (90), a control board disposed within the housing (90), and multiple operating terminals (91) disposed on the housing (90), wherein the control board is equipped with an electromagnetic compatibility module (10), a switching supply power module (20), a main control module (30), an output adjustment module (40), and a dimming control module (50); wherein,
   an input of the electromagnetic compatibility module (10) is connected to an alternating current power supply;
   the switching supply power module (20) is connected to the electromagnetic compatibility module (10);
   the output adjustment module (40) is connected to the switching supply power module (20) and connected to a luminaire, and includes a MOSFET and a drive module (60), wherein a source of the MOSFET is connected to the switching supply power module (20), a drain of the MOSFET is connected to an output terminal, the drive module (60) is respectively connected to the main control module (30) and a gate of the MOSFET, and the luminaire is connected to the output terminal to adjust the brightness of the luminaire;
   the main control module (30) is respectively connected to the switching supply power module (20) and the output adjustment module (40);
   the dimming control module (50) is respectively connected to the main control module (30) and the multiple operating terminals (91) for generating dimming instruction signals; and
   the main control module (30) outputs PWM control signals to the output adjustment module (40) according to the dimming instruction signals generated by the dimming control module (50) to control brightness, color temperature, and/or color of the luminaire.

2. The dimmer-type dimming power supply according to claim 1, further comprising a detection module (70) and an overcurrent protection module (80), wherein one end of the detection module (70) is connected to the switching supply power module (20), the other end of the detection module (70) is respectively connected to the input of the overcurrent protection module (80) and the source of the MOSFET, and the output of the overcurrent protection module (80) is connected to the drive module (60).

3. The dimmer-type dimming power supply according to claim 1, further comprising the detection module (70), one end of the detection module (70) is connected to the switching supply power module (20), the drive module (60) is respectively connected to the main control module (30) and the other end of the detection module (70), and the main control module (30) controls the on-off of the MOSFET through the drive module (60) according to the signal feedback from the detection module (70).

4. The dimmer-type dimming power supply according to claim 1, wherein the dimming control module (50) includes a potentiometer dimming circuit (51) or an encoder dimming circuit for adjusting the brightness of the luminaire.

5. The dimmer-type dimming power supply according to claim 1, wherein the dimming control module (50) includes at least two potentiometer dimming circuits (51) or at least two encoder dimming circuits for adjusting the brightness, color temperature, and/or color of the luminaire.

6. The dimmer-type dimming power supply according to claim 1, wherein the dimming control module (50) is configured as a touch dimming circuit or a wireless signal dimming circuit for adjusting the brightness, color temperature, and/or color of the luminaire.

7. A dimmer-type dimming power supply, comprising a housing (90), a control board disposed within the housing (90), and multiple operating terminals (91) disposed on the housing (90), wherein the control board is equipped with an electromagnetic compatibility module (10), a switching supply power module (20), a main control module (30), an output adjustment module (40), and a dimming control module (50); wherein
   an input of the electromagnetic compatibility module (10) is connected to an alternating current power supply;
   the switching supply power module (20) is connected to the electromagnetic compatibility module (10);
   the main control module (30) is respectively connected to the switching supply power module (20) and the output adjustment module (40);
   the output adjustment module (40) is connected to the switching supply power module (20) and connected to a luminaire, and includes at least two MOSFETs and at least two drive modules (60);

a source of the MOSFETs is connected to the switching supply power module (20), drains of the MOSFETs are respectively connected to at least two output terminals, and the drive modules (60) are respectively connected to the main control module (30) and gates of the MOSFETs to form at least two output adjustment circuits (61); and the luminaire is connected to the output terminals to adjust brightness, color temperature, and/or color;

the dimming control module (50) is respectively connected to the main control module (30) and the multiple operating terminals (91) for generating dimming instruction signals; and the main control module (30) outputs PWM control signals to the output adjustment module (40) according to the dimming instruction signals generated by the dimming control module (50) to control the brightness, color temperature, and/or color of the luminaire.

8. The dimmer-type dimming power supply according to claim 7, further comprising at least two detection modules (70) and at least two overcurrent protection modules (80), wherein a first end of each detection module (70) is connected to the switching supply power module (20), a second end of each detection module (70) is connected to an input of the respective overcurrent protection module (80) and the source of the respective MOSFET, and an output of each overcurrent protection module (80) is connected to the respective drive module (60) to limit output power and output current of each output adjustment circuit (61).

9. The dimmer-type dimming power supply according to claim 7, wherein the dimming control module (50) includes a potentiometer dimming circuit (51) or an encoder dimming circuit for adjusting the brightness of the luminaire.

10. The dimmer-type dimming power supply according to claim 7, wherein the dimming control module (50) includes at least two potentiometer dimming circuits (51) or at least two encoder dimming circuits for adjusting the brightness, color temperature, and/or color of the luminaire.

11. The dimmer-type dimming power supply according to claim 7, wherein the dimming control module (50) is configured as a touch dimming circuit or a wireless signal dimming circuit for adjusting the brightness, color temperature, and/or color of the luminaire.

12. The dimmer-type dimming power supply according to claim 1, wherein the switching supply power module (20) includes a power factor correction module (21) and a power conversion module (22); wherein, the input of the power factor correction module (21) is connected to the electromagnetic compatibility module (10) for improving the power factor and reducing current harmonics; and the input of the power conversion module (22) is connected to the output of the power factor correction module (22), and the output of the power conversion module (22) is respectively connected to the main control module (30) and the output adjustment module (40) for converting power and supplying power to the main control module (30), the output adjustment module (40), and the luminaire.

13. The dimmer-type dimming power supply according to claim 7, wherein the switching supply power module (20) includes a power factor correction module (21) and a power conversion module (22); wherein, the input of the power factor correction module (21) is connected to the electromagnetic compatibility module (10) for improving the power factor and reducing current harmonics; and the input of the power conversion module (22) is connected to the output of the power factor correction module (22), and the output of the power conversion module (22) is respectively connected to the main control module (30) and the output adjustment module (40) for converting power and supplying power to the main control module (30), the output adjustment module (40), and the luminaire.

* * * * *